(12) United States Patent  
Brunet et al.

(10) Patent No.: US 6,371,378 B1
(45) Date of Patent: Apr. 16, 2002

(54) SMART CARD PROVIDED WITH GUARANTEE LABEL

(75) Inventors: Olivier Brunet; Didier Elbaz, both of Marseille (FR)

(73) Assignee: Gemplus (FR)

( * ) Notice: Subject to any disclaimer, the term of this patent is extended or adjusted under 35 U.S.C. 154(b) by 0 days.

(21) Appl. No.: 09/594,594

(22) Filed: Jun. 15, 2000

Related U.S. Application Data

(63) Continuation of application No. PCT/FR98/02691, filed on Dec. 10, 1998.

(30) Foreign Application Priority Data

Dec. 15, 1997 (FR) .............................................. 97/16412

(51) Int. Cl.[7] .............................................. G06K 19/06

(52) U.S. Cl. ....................................... 235/492; 235/487

(58) Field of Search ................................. 235/487, 492

(56) References Cited

U.S. PATENT DOCUMENTS 5,424,527 A * 6/1995 Takahira ...................... 235/492
5,635,702 A * 6/1997 Monicault .................... 235/492

FOREIGN PATENT DOCUMENTS

| DE | 19530608 A1 | 2/1997 |
| EP | 0689163 A1 | 12/1995 |
| EP | 0706153 A2 | 4/1996 |

* cited by examiner

Primary Examiner—Harold I. Pitts
(74) Attorney, Agent, or Firm—Burns, Doane, Swecker & Mathis, L.L.P.

(57) ABSTRACT

The invention relates to a chip card (10) including an electronic module, which module is fitted with an interface for electrical and/or electromagnetic communications formed by electrical contacts (12) and/or an antenna (22). It is characterised in that it includes at least one guarantee label (14) which is bonded to one of its surfaces and which can be unbonded by breaking the adhesion, said label being suitable for preventing said interface (12, 22) from communicating with the outside world.

22 Claims, 2 Drawing Sheets

SMART CARD PROVIDED WITH GUARANTEE LABEL

This application is a continuation of PCT/FR 98/02691 filed Dec. 10, 1998.

This disclosure is based upon, and claims priority from, International Application No. WO99/31625, filed Dec. 10, 1998 and French Patent Application No. 97/16412, filed Dec. 15, 1997, the contents of which are incorporated herein by reference.

FIELD OF THE INVENTION

The present invention relates to cards incorporating an integrated circuit or circuits (known as chip cards or smart cards) which are fitted with a device to guarantee they have not been used.

BACKGROUND OF THE INVENTION

Many chip cards are used as a means of payment and are loaded with a stored value which is often formed by a sum of money or by a certain number of consumable units such as basic charges for telephone calls.

Chip cards of this kind are sold to the general public and it is necessary to give to the purchaser a guarantee that the card he is buying is "virgin", i.e. that it has never been used and that the consumable stored value in it is at a maximum or in other words is equal to the nominal value of the card.

The way in which this is done at the moment is to pack the chip cards in a plastic film, which is generally transparent and sealed. This is not a very effective guarantee for chip cards which operate without contact, i.e. where the interface for exchanges with charging or payment units is an antenna built into the card.

What is more, it is often difficult to remove the card from the plastic protective and guarantee packaging because the packaging is difficult to tear. Also, the packaging becomes rubbish which the purchaser often throws away when he uses the chip card for the first time. And in addition the price of the plastic packaging and especially of putting it in place involves costs which are by no means negligible.

It has already been proposed that a guarantee label should be provided formed by a deposit of material which masks the interface of the chip card (an antenna or electrical contacts) and which can be scratched off. This scratching operation is not always easy nor is it very quick.

What is more, since the label is applied to the electronic module of the chip card, there is a risk that the scratching will damage the module, i.e. the working component of the card.

Finally, some residues may be left from the scratching and these may interfere with the operation of readers into which the chip card is inserted.

SUMMARY OF THE INVENTION

The basic problem faced by the invention is to provide a device for guaranteeing an unused state for a chip card which does not suffer from the above disadvantages.

To this end, the invention relates to a chip card (10) including an electronic module, which module is fitted with an interface for electrical and/or electromagnetic communications formed by electrical contacts and/or an antenna. It is characterised by the fact that it includes at least one guarantee label which is bonded to one of its surfaces and which can be unbonded by breaking the adhesion, said label being suitable for preventing said interface from communicating with the outside world.

The label is easy to fit to the chip card either automatically or manually and its cost price is low. The bond of which the adhesion can be broken enables the label to be pulled off easily in a single operation with no possibility of the chip card, and especially its working component, being damaged.

The label is small in size and if it is thrown away it forms a piece of rubbish which is far less objectionable than plastic packaging and one which is, moreover, quickly degradable.

Finally, the label does not leave on the chip card any traces which would pose a risk of interfering with the operation of readers.

According to another feature, the label is capable of showing whether it has been replaced after having been unbonded. To this end, means for indicating replacement may be provided which are described below.

In this way, any attempt at fraud is deterred and the purchaser is given a guarantee against any previous use of the card.

The label can prevent communications in different ways depending on the communication technique which is being used.

In one embodiment, where the communication is electrical, the label may comprise an insulating film which prevents electrical communications. This film extends over at least part of the contact interface.

In another embodiment, where the communication is electromagnetic, or even electrical, the label may include on its lower face a short-circuiting member which short-circuits the interface.

In another embodiment, where there is an interface comprising an antenna, the label comprises a metal film which forms a screen against electromagnetic communication with the outside world.

In another embodiment, once again where there is an interface comprising an antenna, the label may itself include an antenna circuit suitable for disrupting or diverting any electromagnetic communication with the outside world.

Where there is the short-circuit and an internal antenna, the card may include members for connecting the antenna to the short-circuiting member. The connecting members may be formed by metallised wells.

Where there is an interface having an internal antenna and contacts, certain of the interface's contact areas may be used to connect the short-circuiting member to the internal antenna.

The means for indicating replacement may be produced in different ways.

In various embodiments, the label may include one or more premade cuts which cause it to be damaged when pulled off. The label may also be produced from a material whose appearance changes when it is subjected to mechanical stress. In other cases the label may also be capable of deforming plastically when it is unbonded. It may also include information on its outer face which is difficult to reproduce, such as a hologram.

In certain cases the information may comprise an identifying element. This information is specific to the chip card and makes its possible to detect that the original label has been removed and replaced.

Where required, the information present on the label is capable of being correlated by an algorithm with information present on the card or programmed into the electronic module.

In other cases, the information may form a continuation of information or a graphic motif present on the card such as a printed security element. The motif may be a simple mark which is laser-etched both onto the label and onto the card and/or module.

The label advantageously includes an unbonded area. What is obtained in this way is a gripping area which enables the label to be taken hold of properly in order to be pulled off. This unbonded area may be formed by a gripping tab.

BRIEF DESCRIPTION OF THE DRAWINGS

Other features and advantages of the invention will become apparent from the following description by referring to the accompanying drawings, in which.

DETAILED DESCRIPTION

Figure 1:
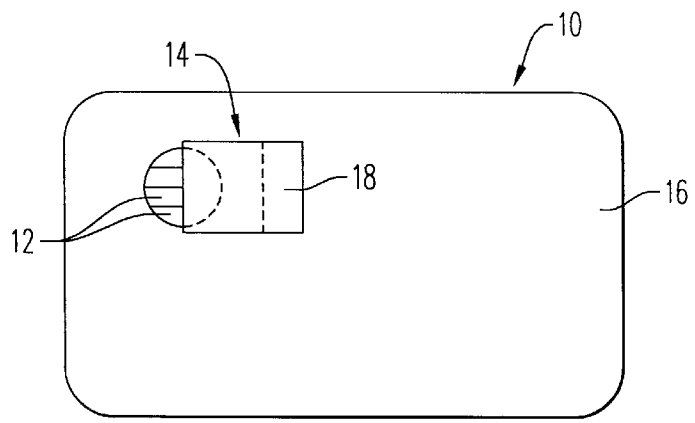
FIG. 1 is a schematic view from above of a first embodiment of chip card according to the invention.

Seen in FIG. 1 is a chip card 10 which is for example intended for paying for services such as the telephone or for the provision of various municipal services. This chip card may also be an electronic purse.

The chip card 10 includes an electronic module in which, in particular, is stored information relating to the amount of stored value for services available from the card. It also includes a card body of which a main surface 16 generally includes printed graphics.

The electronic module includes an interface for exchanges with the outside world which in the present case is formed by connecting terminals or pads (12) some of which are seen in FIG. 1.

In accordance with the invention, there is affixed to the chip card 10, before it is sold, a label 14 which is affixed by bonding, with the adhesion able to be broken, to the upper face of the card. This label 14 covers at least part of the interface of the module which is formed by the electrical contacts 12.

Label 14 may be produced in the form of a polyimide, paper or other film and of an adhesive which allows a break in the adhesion of the label to be obtained when the label is pulled. This adhesive is advantageously thermally activatable, which makes it easier to apply.

Label 14 is removed all in one piece and does not leave any traces on the chip card and in particular on the module which was at least partly masked by the label.

Label 14 includes a part 18 whose lower face is turned towards the card 10 and does not carry any adhesive and is thus not bonded to the chip card 10. This unbonded part forms a gripping tab 18 which allows the label 14 to be taken hold of properly so that it can be pulled off whole all in one go.

Label 14 is advantageously produced from a reel of film to which the adhesive is applied as a backing. Labels of the desired size and shape are then cut out to be affixed to the module, by hot pressing for example.

The parameters of the bonding operation and the bonding agent are defined to ensure good adhesion to the chip card 10 and in particular to the module while at the same time ensuring that the label 14 can easily be withdrawn when it is pulled.

The bonding process may be automatic to allow large quantities of cards to be produced or manual for small quantities. Where required this step may be performed by a third party if the latter needs to perform an intermediate operation before sale to the end customer. The step in question may for example be electrical or graphic personalisation of the card.

Figure 2:
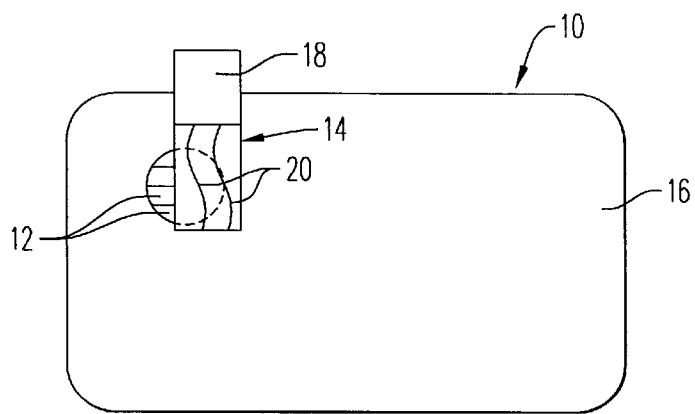
FIG. 2 is a schematic view from above of a second embodiment of the invention.

In FIG. 2, label 14 includes an unbonded tab 18 which projects beyond the outline of the chip card 10 laterally in such a way as to make it even easier for the label to be pulled off.

Also in FIG. 2, label 14 has premade cuts 20 to cause the label to tear when it is removed, which prevents label 14 from being replaced once it has been taken off.

Label 14 may be produced from a material whose shape and/or colour changes when it is subjected to mechanical stress. This embodiment makes it easy to detect any attempt at fraud.

Advantageously, to enable any attempt to replace a different label on a module after the chip card has been used to be detected, information specific to the chip card may be applied to the label. This information may be of the advertising type, a graphic design which incorporates and forms a continuation of the graphic on the card, or traceability information which reproduces information carried on the rest of the card. Printed security elements such as a guilloche pattern, an inscription which is visible only under ultraviolet light, or again microlines, may also be provided.

The inscription may also be formed by a hologram, which is an element providing a very high level of security because it is difficult to reproduce.

Figure 3:
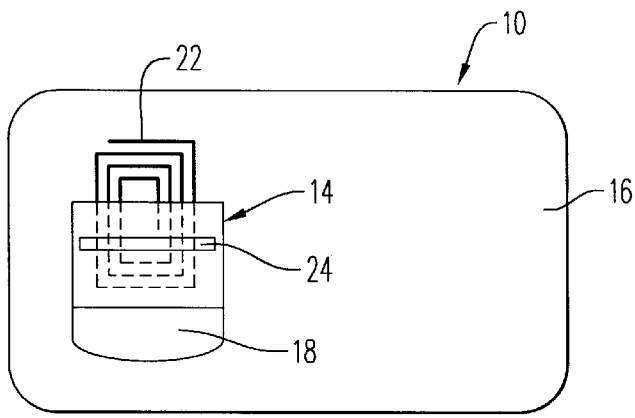
FIG. 3 shows a third embodiment in the case of a chip card which operates with no contact.

In FIG. 3 is shown a chip card which operates without any contact, the interface being formed by an antenna 22 which is built into the card. When this is the case label 14 may include a conductive member 24 in its lower face. This member short-circuits at least some of the turns of the antenna and makes it impossible to use as long as label 14 is present.

It can be seen that the invention enables a guarantee label 14 to be obtained which can easily be removed without generating very much litter. The chip card and, in particular, the module remain intact and no material is produced which might interfere with the operation of readers.

By means of the embodiment shown in FIG. 3, the invention makes it possible for the antenna, and hence the chip card, to be prevented from operating in any way.

Where there is a short-circuit to an internal antenna, the card may include elements for connecting with the antenna which open to the exterior and which are in contact with the short-circuiting member. The connecting elements may be formed by metallised wells.

Where the antenna is internal, the label may comprise a metal film which forms a screen against electromagnetic communications with the outside world. This screen may include an antenna circuit capable of disrupting or diverting electromagnetic communications with the outside world. This screen may include an antenna circuit suitable for disrupting or diverting any electromagnetic communication with the outside world. Where required a screen may be arranged on both sides of the card and will preferably cover the whole of the antenna.

Where there is an interface having an internal antenna and contacts, certain of the contact areas of the interface may be used to connect the short-circuiting member to the internal antenna.

Figure 4:
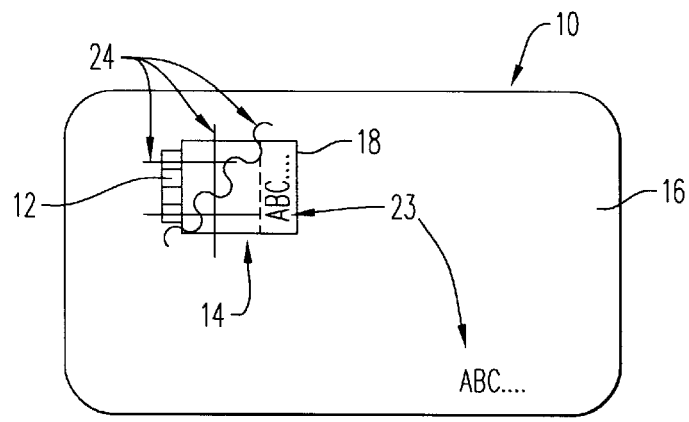
FIG. 4 shows another embodiment of a label provided with security information.

In FIG. 4, the label is bonded partly to the contacts and partly to the printed surface. It includes an unbonded tab. Information is preferably arranged on the label and in particular on the tab. In the example shown, the information is represented by (ABC . . . . ). It may be an identifier which can be used to make the card traceable. The information (ABC . . . ) may be repeated on the card to show that the label is indeed the one which is associated with the card.

The card may also include one or more lines 24 which extend along the body of the card and continue onto the label. Any attempt to put the label back will then be detected by misalignment of these lines.

The lines can be produced by incision or cross-hatching. The label may be laser-etched after being bonded on, the etching being so metered as to allow the surface layer of the module to be marked as well Provision may equally well be made for marking by ink jet or thermal transfer.

Figure 5:
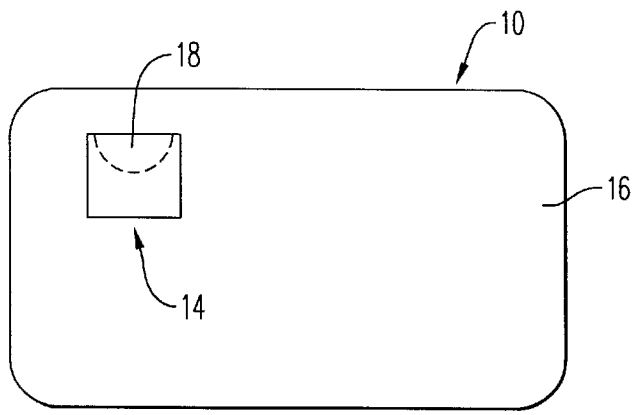
FIGS. 5 and 6 show, respectively, a label of the same shape as the module and a label in the form of a logo.

In FIG. 5 the label is the same shape as the module and covers the whole of the module. It includes an unbonded area 18, which may in particular be in the shape of a finger nail, to make unbending easier. This embodiment has the advantage of not masking any printing which may be present on the card.

Figure 6:
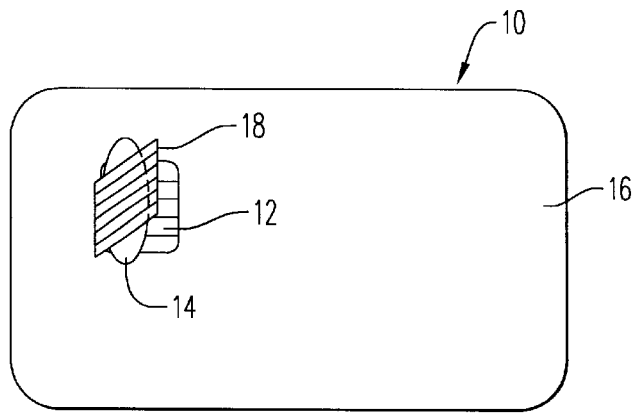

In FIG. 6, the label is in the form of a logo. It may thus perform an additional function which is to carry the logo of, for example, the manufacturer or distributor.

What is claimed is:

1. A chip card including an electronic module, which module is fitted with an interface for communications which is formed by at least one of electrical contacts and an antenna, and further including at least one guarantee label which is bonded to a surface of the chip card and the label can be unbonded by breaking the adhesion, said label being suitable for preventing said interface from communicating with the outside world, wherein the label includes on its lower face a short-circuiting member which short-circuits the interface.

2. A chip card according to claim 1, wherein the label includes means capable of showing that the label has been replaced after having been unbonded.

3. A chip card according to claim 1, wherein the label comprises an insulating film which prevents electrical communications.

4. A chip card according to claim 1, wherein the label comprises a metal film which forms a screen against electromagnetic communications with the outside world.

5. A chip card according to claim 1, wherein the interface comprises an antenna and the label includes an antenna circuit capable of disrupting or diverting electromagnetic communications with the outside world.

6. A chip card according to claim 3, wherein the label extends over at least part of the electrical contact interface.

7. A chip card according to claim 1, further including an internal antenna and connecting elements for connecting the antenna to said short-circuiting member.

8. A chip card according to claim 7, wherein the connecting elements are formed by metallized wells.

9. A chip card according to claim 7, wherein the interface is of the contact and antenna type and said connecting elements are connected to the short-circuiting member via the contact interface.

10. A chip card according to claim 1, wherein the label includes an unbonded gripping tab.

11. A chip card according to claim 1, wherein the label includes a premade cut which causes the label to be damaged when it is pulled off the card.

12. A chip card according to claim 1, wherein the label is produced from a material whose appearance changes when it is acted on by a mechanical stress.

13. A chip card according to claim 1 wherein the label is capable of deforming plastically when it is unbonded.

14. A chip card according to claim 1, wherein the label includes information on its outer face.

15. A chip card according to claim 14, wherein the information comprises a hologram.

16. A chip card according to claim 14, wherein the information comprises an identifying element.

17. A chip card according to claim 14 wherein the information present on the label is capable of being correlated by an algorithm with information present on the card or programmed into the electronic module.

18. A chip card according to claim 14 wherein the information forms a continuation of information or a graphic motif present on the card such as a printed security element.

19. A chip card according to claim 1, wherein the label includes a mark which is laser-etched both onto the label, onto the card and/or onto the module.

20. A chip card according to claim 1, wherein the label is identical in shape to the electronic module.

21. A chip card according to claim 1, wherein the label is of a form reminiscent of an advertising type element of the logo type.

22. A chip card according to claim 1, wherein the label includes a thermoplastic adhesive.

* * * * *